(12) United States Patent
Bala

(10) Patent No.: US 6,937,253 B2
(45) Date of Patent: Aug. 30, 2005

(54) METHOD FOR DETERMINING COLOR SPACE OF AN IMAGE

(75) Inventor: Raja Bala, Webster, NY (US)

(73) Assignee: Xerox Corporation, Stamford, CT (US)

( * ) Notice: Subject to any disclaimer, the term of this patent is extended or adjusted under 35 U.S.C. 154(b) by 19 days.

(21) Appl. No.: 10/733,583

(22) Filed: Dec. 11, 2003

(65) Prior Publication Data

US 2005/0128218 A1 Jun. 16, 2005

(51) Int. Cl.$^7$ .............................................. G09G 5/02
(52) U.S. Cl. ..................... 345/589; 345/590; 345/591; 345/593; 345/595; 345/604; 382/170; 382/172; 348/222.1
(58) Field of Search ............................... 345/590–593, 345/595

(56) References Cited

U.S. PATENT DOCUMENTS 6,744,917 B1 * 6/2004 Sadowski et al. ........... 382/162

2004/0119843 A1 * 6/2004 Hoshuyama ............. 348/222.1
2004/0228523 A1 * 11/2004 Hibi et al. .................. 382/162

* cited by examiner

Primary Examiner—Matthew C. Bella
Assistant Examiner—Antonio Caschera
(74) Attorney, Agent, or Firm—Jeannette Walder

(57) ABSTRACT

A method for determining whether an input image is defined in accordance with a luminance-chrominance color space, includes receiving an input image in three dimensional color space, S1, S2 and S3, where S1 is an image value in the first dimension, S2 is an image value in the second dimension and S3 is an image value in the third dimension; extracting low and high extrema of S1 values in the image; obtaining deviation of S2 and S3 from a predefined neutral axis for all pixels in the image whose S1 value is either the low or the high extremum; testing a condition that certain of the deviations are within predetermined thresholds; and determining, if the condition holds true, that the image is in a luminance-chrominance color space.

16 Claims, 1 Drawing Sheet

METHOD FOR DETERMINING COLOR SPACE OF AN IMAGE

FIELD OF THE INVENTION

This invention relates generally to color management systems and methods, and more particularly to a method for automatically determining the color space of an input image.

BACKGROUND OF THE INVENTION

Color image reproduction systems include an input device for obtaining a representation of an original image and an output device for generating a replica of the image. Input and output devices use signals that represent the colors in the image as coordinates in some device dependent color space. The term "color space" refers to an N-dimensional space in which each point corresponds to a particular color. Examples of device-dependent three-dimensional color space include RGB (red (R), green (G) and blue (B)) and CMY (cyan (C), magenta (M) and yellow (Y)). Frequently, it is advantageous to transform device dependent color images into device independent color images. Examples of device independent color spaces include luminance-chrominance color spaces such as CIELAB, $YC_bC_r$, and HSV (hue saturation value) space.

In order to provide the correct output, the output device must know in which color space the input image is defined. Similarly, an image processing module that takes as input a color image must know the color space in which the image is defined. Incorrect assumptions on the colorimetry of image data can result in unpredictable and usually undesirable output quality from a color management system. A rather extreme case of this is when the assumed class of color space, e.g, RGB vs. CMY vs. luminance-chrominance, is incorrect. Many file formats encode the color space class in the header. However, a robust color management system must take into account cases where header information is incomplete, missing, or incorrect.

SUMMARY OF THE INVENTION

A method is described for automatically determining whether a 3-channel color image is in a device dependent color space such as RGB or a luminance-chrominance color space. The method may be used to determine whether an input image is in luminance-chrominance space (such as YCC, LAB or HSV) or in a device dependent color space, such as RGB or CMY, without reference to any header or auxiliary information in the image file. Color space differentiation can be used in isolation or in conjunction with other image processing or analysis algorithms. The method is based on the concept that in a luminance-chrominance representation, when the first channel (e.g., luminance) takes on very low or high values, there are constraints in the allowable values taken on by the other two chrominance channels. Namely, for colors with very high or very low luminance, the chrominance values are expected to be on or close to the neutral axis of the luminance-chrominance space. The neutral axis definition depends on the encoding of the color space. For example, in most 8-bit luminance-chrominance encodings, the chrominance values of a neutral color are both typically 128. Thus colors with very high or very low luminance values are expected to have chrominance values close to 128. These constraints do not hold for the RGB or CMY case. This concept is used to distinguish the two classes of color spaces.

A method for determining whether an input image is defined in accordance with a luminance-chrominance color space, according to the invention, includes receiving an input image in three dimensional color space, S1, S2 and S3, where S1 is an image value in the first dimension, S2 is an image value in the second dimension and S3 is an image value in the third dimension; extracting low and high extrema of S1 values in the image; obtaining deviation of S2 and S3 from a predefined neutral axis for all pixels in the image whose S1 value is either the low or the high extremum; testing a condition that certain of the deviations are within predetermined thresholds; and determining, if the condition holds true, that the image is in a luminance-chrominance color space. If the condition is false, the image is in an RGB color space.

The entire input image need not be used; only a subset of the entire set of image pixels in the input image may be sampled. Extracting the low and high extrema of S1 values in the image may be accomplished by creating a histogram for S1 denoted by an array HIST, where HIST[i] is the number of image pixels whose S1 value is equal to i; defining the high extremum $i_{high}$ to be the highest value of i for which HIST[i] is greater than a predetermined threshold K1; and defining the low extremum $i_{low}$ to be the lowest value of i for which HIST[i] is greater than a predetermined threshold K2

DETAILED DESCRIPTION OF THE EMBODIMENTS

Figure 1:
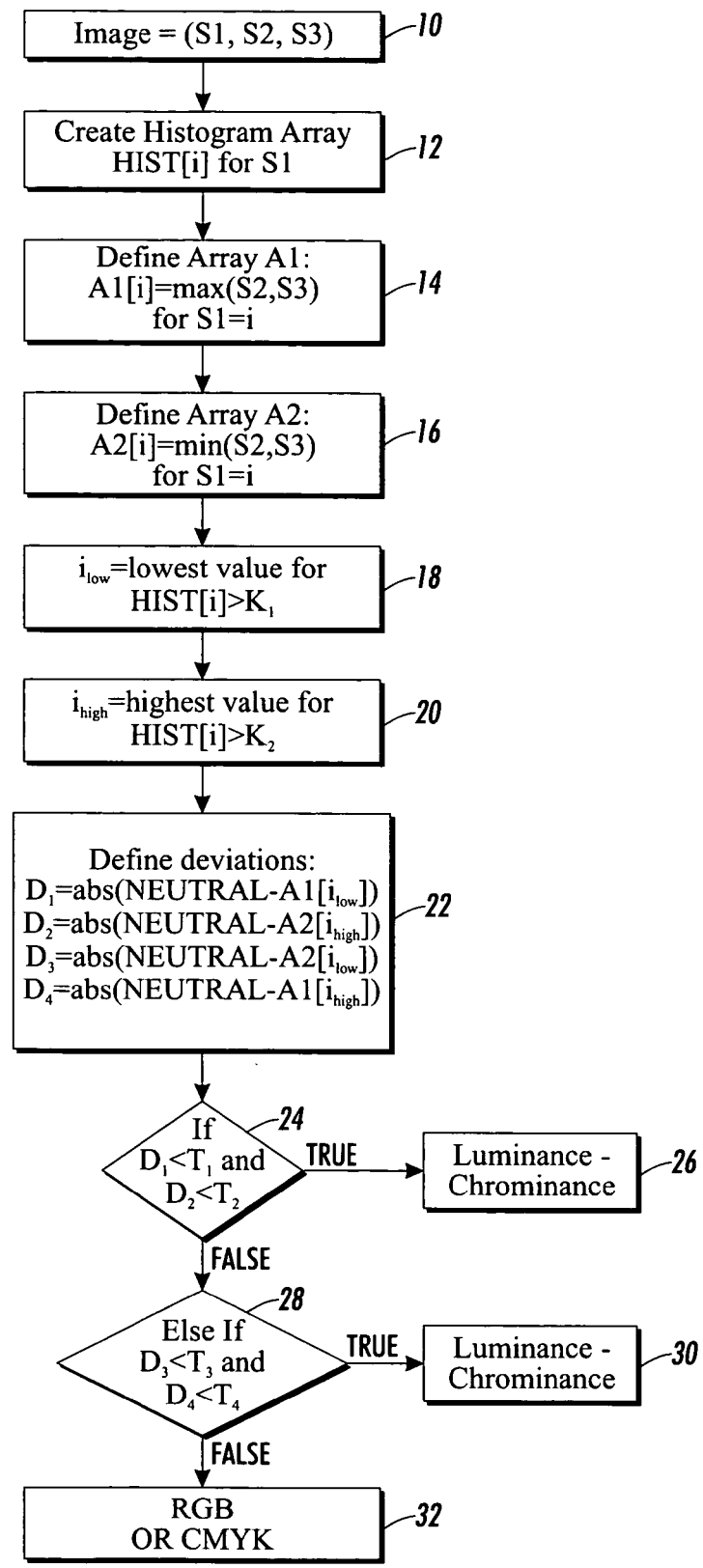
FIG. 1 is a flow chart of a method for determining color space of an image.

Referring now to the drawing, FIG. 1 is a flow chart of a method of determining the color space of an input image. Denote the three separations of an input image as S1, S2, and S3 step 10). If the image is in luminance-chrominance, then very high or low values of S1, the luminance component, correspond to colors near white and black, respectively, both of which are neutral colors. In these cases, the other 2 channels, S2, and S3 should be similar in value, and close to the neutral value, e.g., 128 in an 8 bit representation. If the image is in RGB such a constraint does not exist. Very high or low values of S1 (i.e., red) in ROB color space could occur with any combination of the other 2 channels.

There are some cases where the aforementioned assumption may not hold. For example, suppose a saturated yellow is the lightest color in a luminance-chrominance representation. This results in both the S1 and yellow-blue dimensions taking on high values, and the red-green signal being in the vicinity of the neutral value. A similar situation occurs if a saturated blue is the darkest color in the image. However, the fact that there is a constraint on the red-green channel can be used to take care of both cases.

A specific implementation of the method to accomplish the classification is described below.

Referring again to FIG. 1, create an array HIST which keeps a histogram of S1 (step 12). Define two arrays A1 and A2 of length 256 (adjusted according to input data precision). As the image is visited, A1 and A2 are built as follows:

A1[i]=max (S2, S3) over all pixels in the image for which S1=I (step 14) and

A2[i]=min (S2, S3) over all pixels image for which S1=I (step 16).

After the image has been traversed, define $i_{low}$ as the lowest value of i for which HIST[i] is greater than some threshold, $t_1$ (step 18). Define $i_{high}$ as the highest values of i for which HIST[i] is greater than some threshold, $t_2$ (step 20). The thresholds $t_1$ and $t_2$ are set to some small value in order to eliminate colors with very small pixel counts.

Next, define maximum deviations from neutral for the last two channels, occurring at $S1=i_{low}$ and $S1=i_{high}$ (step 22):

D1=abs(NEUTRAL−A1[$i_{low}$]);
D2=abs(NEUTRAL−A2[$i_{high}$]);
D3=abs(NEUTRAL−A2[$i_{low}$]); and
D4=abs(NEUTRAL−A1[$i_{high}$]), where abs( ) denotes absolute value, and NEUTRAL denotes the assumed neutral value in the given color space encoding. For example, in an 8-bit luminance-chrominance encoding, NEUTRAL is typically 128. Generally D1–D4 will take on small values in the case of luminance-chrominance images; while at least one of these will take on large values in the case of RGB images. To account for the blue and yellow cases described earlier for luminance-chrominance images, a larger range in the blue-yellow dimension must be allowed, while keeping a tighter constraint on the red-green dimension. Also, it must be noted that there are different flavors of luminance-chrominance spaces. In the YES and CIELAB spaces, the second and third dimensions represent red-green and yellow-blue variations respectively; while in $YC_bC_r$, the order and polarity are changed: the second and third dimensions are now blue-yellow and red-green. A simple classification rule that takes all these factors into account is:

If (D1<T1) AND (D2<T2) (step 24) classify as luminance-chrominance (CIELAB case) (step 26)
else if (D3<T3) AND (D4<T4) (step 28) classify as luminance-chrominance ($YC_bC_r$ case) (step 30)
else classify as RGB (step 32), where T1–T4 are predetermined thresholds chosen from analyzing a set of training images.

To increase the efficiency of the method, the image may be sub-sampled, with only a small subset of pixels being traversed. Also, some cases of RGB input can be detected before the full image is swept. For example, if pixels in the vicinity of [255,255,255], [255,0,0], [0,0,0] etc., are encountered, it is already known that the data is in RGB.

The method has been demonstrated to successfully distinguish between luminance-chrominance space and RGB for a large set of test images. Based on an analysis of the parameters D1–D4 for a set of training images, the following threshold values appear to produce good results for 8 bit image data: T1=T3=25, T2=T4=35.

One potential failure mode is the case where an RGB image, such as a test target, contains a small palette of colors chosen so that D1–D4 all take on small values, thus looking like a luminance-chrominance image to the algorithm. In such cases, there is insufficient context for the method to determine the color space. In fact, unless other contextual knowledge is available, this confusion may well occur even with visual inspection. Appropriate checks on $i_{low}$ and $i_{high}$, as well as a count of the number of distinct image colors can help identify such pathological cases, and have the method report a low degree of confidence in classification.

In the case where there is no header information, misclassification of RGB vs. luminance-chrominance will result in gross errors in downstream imaging all the way to the final output. In the case where header information is available, the method serves as an extra check to validate the color space, and can be combined with other image processing algorithms.

Another scenario where the method may be used is with documents comprising multiple image components assembled from different sources, and possibly in different color spaces. If the color space of each component is not individually labeled, this method can be used to extract this information, and attach the metadata to each component for correct processing by other imaging modules.

The invention has been described with reference to particular embodiments for convenience only. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method for determining whether an input image is defined in accordance with a luminance-chrominance color space, comprising:
   receiving an input image in three dimensional color space, S1, S2 and S3, where S1 is an image value in the first dimension, S2 is an image value in the second dimension and S3 is an image value in the third dimension;
   extracting low and high extrema of S1 values in the image;
   obtaining deviation of S2 and S3 from a predefined neutral axis for all pixels in the image whose S1 value is either the low or the high extremum;
   testing a condition that certain of the deviations are within predetermined thresholds; and
   determining, if the condition holds true, that the image is in a luminance-chrominance color space.

2. The method of claim 1, wherein receiving an input image comprises receiving a subset of the entire set of image pixels in the input image.

3. The method of claim 1, wherein extracting the low and high extrema of S1 values in the image comprises:
   creating a histogram for S1 denoted by an array HIST, where HIST[i] is the number of image pixels whose S1 value is equal to i;
   defining the high extremum $i_{high}$ to be the highest value of i for which HIST[i] is greater than a predetermined threshold K1; and
   defining the low extremum $i_{low}$ to be the lowest value of i for which HIST[i] is greater than a predetermined threshold K2.

4. The method of claim 3, wherein obtaining the deviation of S2 and S3 from the neutral axis comprises:
   defining an array A1[i]=max(S2, S3) over all pixels for which S1=i;
   defining an array A2[i]=min(S2, S3) over all pixels for which S1=i; and
   defining the deviations from the neutral axis, denoted NEUTRAL, by:
   D1=abs(NEUTRAL−A1[$i_{low}$]);
   D2=abs(NEUTRAL−A2[$i_{high}$]);
   D3=abs(NEUTRAL−A2[$i_{low}$]);
   D4=abs(NEUTRAL−A1[$i_{high}$]).

5. The method of claim 4, wherein NEUTRAL takes on value of 128 in an 8 bit color space encoding.

6. The method of claim 4, wherein testing the condition comprises: testing if D1 is less than T1 and D2 is less than T2, where T1 and T2 are predetermined thresholds.

7. The method of claim 6, wherein testing the condition additionally comprises: testing if D3 is less than T3 and D4 is less than T4, where T3 and T4 are predetermined thresholds.

8. The method of claim 1, further determining that if the condition is false, the image is in an RGB color space.

9. A system for determining whether an input image is defined in accordance with a luminance-chrominance color space, comprising:
    an input device for receiving an input image in three dimensional color space, S1, S2 and S3, where S1 is an image value in the first dimension, S2 is an image value in the second dimension and S3 is an image value in the third dimension; and
    a processor, responsive to the received input image, for extracting low and high extrema of S1 values in the image; for obtaining deviation of S2 and S3 from a predefined neutral axis for all pixels in the image whose S1 value is either the low or the high extremum; for testing a condition that certain of the deviations are within predetermined thresholds; and for determining, if the condition holds true, that the image is in a luminance-chrominance color space.

10. The system of claim 9, wherein the input device receives a subset of the entire set of image pixels in the input image.

11. The system of claim 9, wherein the processor extracts the low and high extrema of S1 values in the image by:
    creating a histogram for S1 denoted by an array HIST, where HIST[i] is the number of image pixels whose S1 value is equal to i;
    defining the high extremum $i_{high}$ to be the highest value of i for which HIST[i] is greater than a predetermined threshold K1; and
    defining the low extremum $i_{low}$ to be the lowest value of i for which HIST[i] is greater than a predetermined threshold K2.

12. The system of claim 9, wherein the processor obtains the deviation of S2 and S3 from the neutral axis by:
    defining an array A1[i]=max(S2, S3) over all pixels for which S1=i;
    defining an array A2[i]=min(S2, S3) over all pixels for which S1=i; and
    defining the deviations from the neutral axis, denoted NEUTRAL, by:
    D1=abs(NEUTRAL−A1[$i_{low}$]);
    D2=abs(NEUTRAL−A2[$i_{high}$]);
    D3=abs(NEUTRAL−A2[$i_{low}$]);
    D4=abs(NEUTRAL−A1[$i_{high}$]).

13. The system of claim 12, wherein NEUTRAL takes on value of 128 in an 8 bit color space encoding.

14. The system of claim 12, wherein the processor tests the condition by testing if D1 is less than T1 and D2 is less than T2, where T1 and T2 are predetermined thresholds.

15. The system of claim 12, wherein the processor further tests the condition by testing if D3 is less than T3 and D4 is less than T4, where T3 and T4 are predetermined thresholds.

16. The system of claim 9, further determining that if the condition is false, the image is in an RGB color space.

* * * * *